United States Patent [19]

Finkelman et al.

[11] Patent Number: 4,570,349
[45] Date of Patent: Feb. 18, 1986

[54] PRECISION ELECTRONIC MEASURING INSTRUMENTS

[75] Inventors: Steven L. Finkelman, Chicago; Moshe Tseitlin, Lincolnwood, both of Ill.

[73] Assignee: M. Y. Finkelman Company, Chicago, Ill.

[21] Appl. No.: 585,910

[22] Filed: Mar. 2, 1984

[51] Int. Cl.$^4$ .............................................. G01B 7/14
[52] U.S. Cl. ................................. 33/143 L; 33/143 M
[58] Field of Search ............ 33/143 L, 143 R, 143 M, 33/147 N

[56] References Cited

U.S. PATENT DOCUMENTS 2,467,263  4/1949  Krisanda ........................... 33/143 M
2,529,931  11/1950  Gallup, Sr. ........................ 33/143 M

FOREIGN PATENT DOCUMENTS 2710312  9/1978  Fed. Rep. of Germany ... 33/143 M
347009  7/1960  Switzerland ..................... 33/143 M
289299  4/1928  United Kingdom ............. 33/143 M Primary Examiner—Willis Little
Attorney, Agent, or Firm—Laff, Whitesel, Conte & Saret

[57] ABSTRACT

Electronic precision measuring instruments such as calipers, micrometers, and the like, are adapted for measuring odd and irregular shapes. The electronics are built into the measuring instruments to respond to a pinion gear rolling along a rack of teeth responsive to the movement of a movable jaw mounted on an arm having a stationary jaw and the rack of gear teeth associated therewith. A matched pair of adapters fit over and lock to the jaws. The adapters include a set of pins having lengths and shapes which may fit into and around unique spaces and structures. The adapter pins may be either confronting or opposing to enable either inside or outside measurements.

10 Claims, 7 Drawing Figures

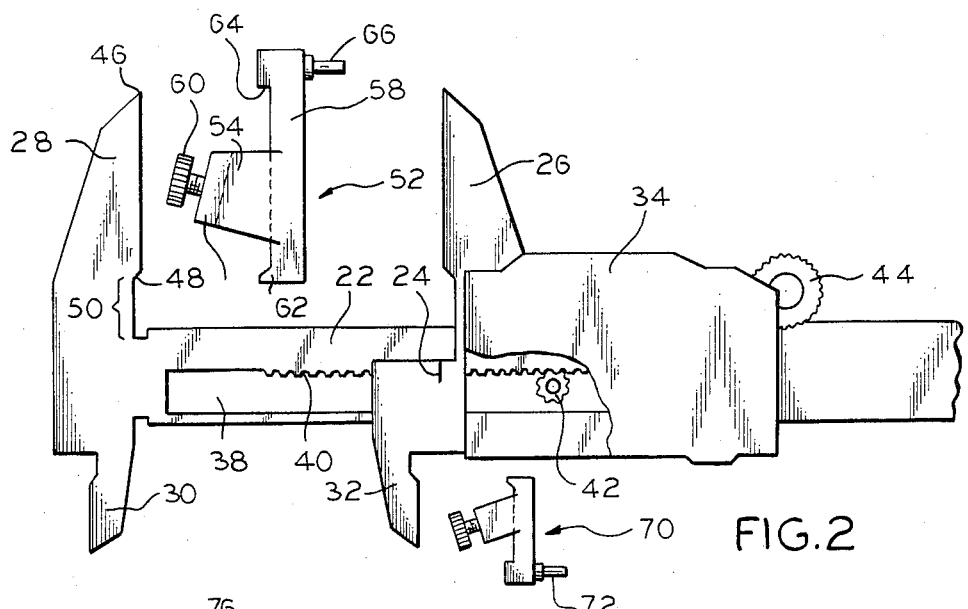
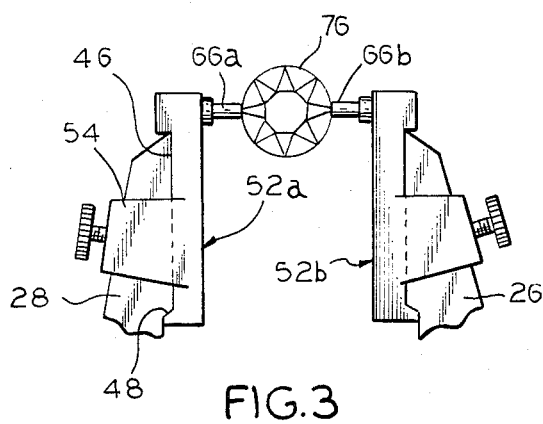
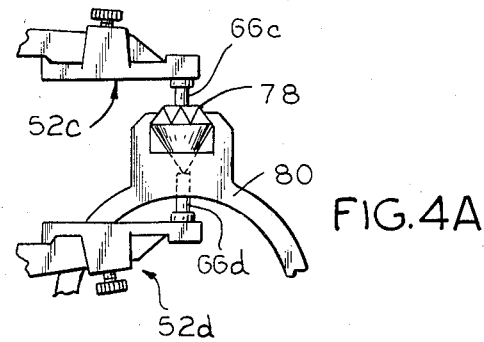
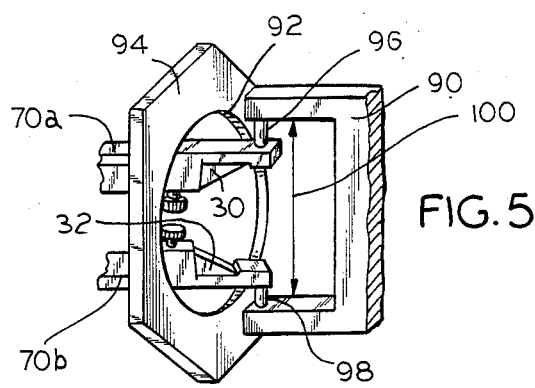
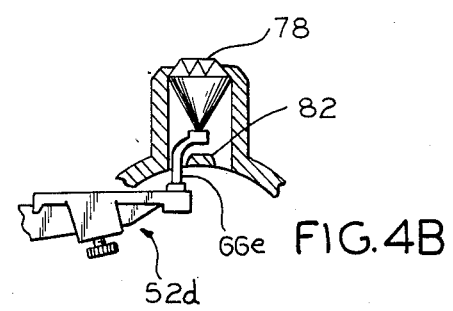
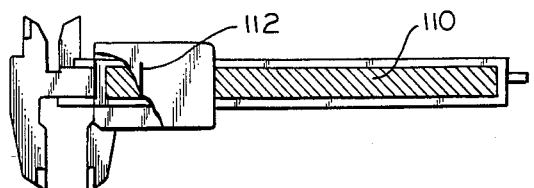
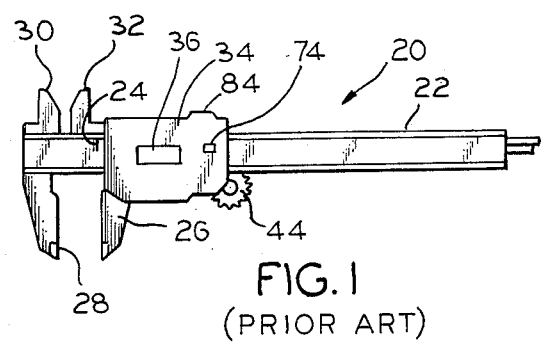

PRECISION ELECTRONIC MEASURING INSTRUMENTS

This invention relates to electronic measuring instruments and, more particularly, to precision measuring instruments such as calipers, micrometers, and the like, for measuring odd and irregular shapes and surfaces.

Traditionally, measuring instruments of the described type have been superb mechanical devices which were manufactured with extremely small tolerances. Care was taken to eliminate practically all looseness, backlash, ambiguous scales, etc. As a result, these measuring instruments have been very expensive, for the functions that they could perform. Also, they depended upon the skill of the person using them. One person could tighten the jaws sufficiently to get a significantly different reading as compared to someone else who bearly closed the jaw.

Recently, electronics have proceeded to a point where relatively powerful calculating circuits may be built into extremely small spaces. These circuits enable a digital read out to be made with extreme accuracy. Thus, the electronics may be built into the measuring instruments to respond to accurate—but low cost—devices, such as measurements taken from a gear rolling along a rack of teeth or a pickup head scanning a recorded magnetic strip. This use of mechanical devices, such as a rolling gear, makes it possible to eliminate much of the costly machinery which used to be required to get precision.

As a result, electronic measuring instruments (such as calipers, micrometers, and the like) are now available, which contain electronic calculators with liquid crystal display ("LCD") digital displays. The measuring instrument may, for example, include a pair of movable jaws mounted on an arm having a rack of gear teeth associated therewith. A pinion gear may be associated with the calculator, to roll along the rack as the jaws are opened or closed. The rotation of the pinion gear causes electrical signals to be delivered to the calculator to indicate how far the jaws are opened, relative to a starting or zero position. The calculator responds to these signals to give a digital read out at the LCD display, which informs the user as to the distance between the jaws.

In some measuring instruments, the calculator may also be connected to another instrument, such as a computer or printer, so that an analysis or printed record may be made responsive to the jaw positions.

Heretofore, the described type of electronic instruments have not taken advantage of all of the computing power which exists in the electronic devices used in the calculator. For example, a jeweler may estimate the carats or weight of a diamond by measuring its diameter and depth. Obviously, his measurements must take into account whether the cut is brilliant, marquise, emerald, pear shaped, or the like. He considers any departures of the diamond from standard, such as an overly thick girdle or a narrow or wide table. Again, this requires judgment. Calculators and computers have been programmed to give a direct read out, in term of weight, for any of these cuts, with a pushbutton to modify the readings for the departures from standard. Moreover, the same calculator may also be programmed to give similar read outs for pearls, rubies, or the like.

The measurements of such a jewel also exemplifies the problems which may be encountered. At the time of making the measurements, the stone may be in almost any kind of a setting, such as a ring, earring, pin, or the like. Thus, there is a problem of taking measurements in and around the almost unlimited variety of different findings or shapes, which may surround and obstruct access to a stone.

Accordingly, an object of the invention is to provide new and improved precision measuring devices. Here, an object is to provide extremely flexible measuring devices which may be adapted (within reason) to measure almost any object of the described type and almost without regard to its irregular or odd shape.

Yet another object of the invention is to provide new and improved adapters for modifying the jaws of a measuring device to adapt them to measure according to almost any custom and usage.

In keeping with an aspect of the invention, these and other objects are accomplished by matched pairs of adapters which fit over and lock to the jaws of an electronic caliper. Each pair of adapters includes a pin or set of pins having lengths and shapes which may fit into and around unique spaces and structures. The adapter pins may be either confronting or opposing to enable either inside or outside measurements.

The preferred embodiments of the invention are shown in the drawings, in which:

FIG. 1 is a plan view of a prior art electronic digital caliper;

FIG. 2 is a similar view of the caliper with exemplary inside and outside adapters lying next to the jaws on which they fit;

FIG. 3 is a fragment of the jaws with a pair of opposing adapters in place;

FIGS. 4A and 4B show, by way of example, a caliper using two different adapters to measure the depth of a mounted stone;

FIG. 5 shows an examplary set of adapters, also by way of example, reaching through a hole in an escutcheon and measuring the inside dimensions of an opening; and FIG. 6 shows an embodiment using a pickup and a magnetic strip to read the jaw position.

A prior art electronic digital caliper 20 (FIG. 1) has an arm 22 with a scale printed or enscribed thereon. A suitable index 24 (such as a Vernier scale) may be printed or enscribed on a moving one 26 of a pair of jaws 26, 28 to identify the position of the jaw on the scale. This is the conventional way of using a caliper to measure the spacing between the jaws. The jaws 26, 28 may have inside edges to measure the outside dimensions of an object, while integrally joined opposing jaws 30, 32 may have outside edges to measure the inside dimensions of an object.

Mounted on and movable with the movable jaw 26, 32 is a calculator 34 having a digital read out. Integral with the stationary jaw 28 is an arm 22 having a channel 38 (FIG. 2) machined along the length thereof. In one embodiment, a rack 40 of gear teeth extends longitudinally along one side of the channel 38 to receive the teeth of a pinion gear 42 mounted on the movable jaw 26, 32 and in the housing of computer 34. As the jaw 26, 32 moves, the pinion 42 rotates to send signals to the computer. Those signals are used by the computer to give a digital read out at display 36 which indicates exactly how far the moving jaw has moved relative to either a zero position or the stationary jaw 28, 30. Accordingly, the user may make either direct readings at either the mechanically enscribed scale 24 or the digital read outs at display 36.

Measurements are made relative to an arbitrary zero point. Typically, the zero point is the location where the jaws are closed, or the pins are touching each other. When the pins are in opposition to each other (i.e. on jaws 30, 32), there is no way to find a reference point unless a separate fixture is used. In that case, all measurements are relative to a zero point where the pins are in contact with that fixture.

A thumb wheel 44 is also mounted on the moving jaw to roll along arm 22 and thereby enable very small and accurate movements thereof.

FIG. 2 shows how the prior art device of FIG. 1 is used according to the invention. In greater detail, each of the jaws 26–32 terminates at its free end in a point, as shown at 46, by way of example. Near the supported end of each jaw, there is a step 48 and relief area, as shown at 50. Therefore, an adapter 52 may be provided to slip over the end of the jaw.

In greater detail, each adapter 52 includes a body with a pocket 54 which has an accurately dimensioned interior to slip over and receive the jaw 28, as shown in FIG. 3. The sides of pocket 54 are defined on the left, and right, respectively (as viewed in FIG. 2) by vertical sections 56, 58. Section 56 includes a threaded hole for receiving a locking thumb screw 60, which enters the pocket 54 and takes a bite against the back of the jaw 28 to lock the adapter into position. On the opposite side of the pocket 54, straight side 58 terminates at the bottom in a foot 62 which fits over and bears against the step 48 on the jaw. The top of the straight part 58 may end in step 64 which receives and captures the tip end 46 of the jaw. This end provides stability and is not always required since the tapered fit of the pocket 54 and the effect of the foot 62 may provide an adequate stability.

The adapters 52 may be made of any suitable material as long as the measuring tips remain in a stable position. For example, the entire part may be molded from plastic or metal, and then inwardly directed steel pins 66 may be press fit into place. The vertical arm 58 is strong enough so that it does not deflect; the pin 66 is hard enough not to dent or mushroom or otherwise cause problems.

The adapters may be manufactured in any of many different forms, depending upon the user's needs. For example, FIG. 2 shows the pin 66 press fit into a hole in arm 58, which hole is horizontal and is in the plane of the paper, as viewed in FIG. 2. Instead of this, the hole could be rotated by 90° so that the pin extends perpendicularly with respect to the plane of the paper. Or, the hole could be rotated by 90° so that the pin remains in the plane of the paper but projects vertically out the top of the arm 58, as viewed in FIG. 2. In still other cases, the pin may have one or more bends in it. As an example of the uses which these modifications provide, the table of a diamond may be placed against a flat surface, the table being in a plane perpendicular to the paper, as viewed in FIG. 2. The adapter on jaw 26 may have a vertical pin which may be brought up to point at the girdle. This enables the user to estimate the percentage of the diamond which is above the girdle.

Similar adapters 70 may be made to fit the lower jaws 30, 32 which read the inside dimensions of an opening. If this adapter is used, the pins 72 point outwardly.

FIG. 3 shows fragments of jaws 26, 28, with adapters 52a, 52b secured in place. The inwardly directed pins 66a, 66b confront each other to measure an outside dimension between them. Thus, the movable jaw 26 is brought up to a point where the two pins 66a, 66b touch each other. Then, a zero pushbutton 74 (FIG. 1) is operated and the calculator stores "zero". Thereafter, the jaws (26, 28) may be opened or closed and the digital display 36 indicates the distance over which the jaws move relative to each other. Therefore, if the jaw 26 is opened and diamond 76 is held between the pins 66a, 66b, the jaw 26 may be closed until both pins touch the girdle. At this time, the digital display 36 indicates the distance between the tips of the pins, or the outside diameter of the diamond 76. Since the same person adjusts the jaws for both the zero set and the actual measurement, the differences between the "touch" of various users is eliminated.

Very often, there are special problems of making measurements. For example, FIG. 4 shows a diamond 78 mounted in a ring 80. The top of the stone is readly accessible, but the bottom of the stone is deep inside the ring. Therefore, the top of the stone may be reached by a very short pin 66c. However, a very long pin 66d is required to reach inside the ring and to touch the bottom of the stone. This difference is easily accomplished by selecting a correct one of many adapters 52c, 52d.

It is easy to imagine many different lengths and shapes of pins which may be placed in the adapters. Or, the pins could have almost any configuration, such as angles, curves, or the like, in order to reach in and around obstacles. The only requirement is that the positions of the confronting tip ends of the pins should be reliable. Thus, for example, if the pin 66d should have an "S-shape" instead of being straight, as shown, the pin must be strong enough so that the top and the bottom of the "S" cannot flex relative to each other. For example, FIG. 4A shows a setting almost the same as that shown in FIG. 4, except that an obstruction 82 blocks direct access to the bottom of the stone. Therefore, a curved pin 66e is provided to fit around the obstructions (shown by cross hatching) and into the open spaces (the non-cross hatched) within the setting.

From the showings in FIGS. 3 and 4, it is seen that both the diameter and the depth of the diamond may be measured. Existing charts and tables enable an experienced jeweler to estimate the weight of a diamond from these two measurements. Therefore, it is a simple matter to store the information on these tables in read only memories built the calculator 34 or accessible from another computer which may be connected to the calculator via an extension cord. Then, the jeweler uses the inventive device as shown in FIGS. 3, 4 to measure these critical dimensions, pushing a button at 84 after each measurement is taken. Either digital display 36 or a connected computer may read out the carat weight of the diamond.

FIG. 5 shows how, the caliper jaws 30, 32 which are designed to measure inside diameters may be used with the inventive adapters. Here, a hypothetical device 90 is positioned behind a hole 92 in a plate 94. Adapters 70a, 70b are fastened to jaws 30, 32 which may be slipped through the hole 92. The outwardly directed pins 96, 98 on the adapters 70a, 70b may be fitted against the inside surfaces of an opening 100, in the part 90. Again, the reading may be taken with respect to either a zero setting or the location of movable jaw 26, 32 relative to the stationary jaw 28, 30.

The same considerations that were explained above in connection with the adapters 52 may also apply to the adapters 70. The pins 96, 98 may have any convenient length or shape. The standard reading may be given from an associated computer or read out device, for example. The computer 34 may measure distances. Or, it may be programmed to measure almost any other suitable dimensions. For example, the circumference or cross sectional area of an opening may be displayed responsive to a reading of a diameter.

The calculator may be plugged into any of various suitable peripheral devices, such as printers, for example.

FIG. 6 shows a modification wherein a strip 110 of magnetic material extends along the arm of the caliper to enable a pickup 112 to detect the position of the jaw as it moves along the arm. Otherwise, the embodiment of FIG. 6 operates the same as the embodiment of FIG. 1.

Those who are skilled in the art will readily perceive how to modify the system. Therefore, the appended claims are to be construed to cover all equivalent structures which fall within the true scope and spirit of the invention.

The invention claimed is:

1. An electronic measuring instrument comprising a set of jaws mounted for one of said jaws to move toward or away from the other of said jaws, each of said jaws having a point on one end with a step and relief area on the other end with a straight section therebetween, electronic read out means responsive to the movement of said one jaw for indicating a relative distance between said jaws, adapter means for fitting over and locking to said jaws, said adapter means comprising a pocket having a straight section on one side with a step on one end and a foot on the other end of said straight section, said step on said adapter fitting over said point on said jaw and said foot fitting over said step and into said relief area on said jaw, and pins in each of said adapter means projecting from said jaws to enable them to measure odd and irregular shapes.

2. The electronic measuring instrument of claim 1 wherein there are a plurality of said adapters arranged in sets, the pins on each of said sets having different physical characteristics.

3. The electronic measuring instrument of claim 2 wherein the characteristics of said pins are such that said pins vary in length.

4. The electronic measuring instrument of claim 2 wherein the characteristics of said pins are such that said pins vary in shape.

5. The electronic measuring instrument of claim 1 and calculator means mounted on said instrument for reading out the distance between said jaws in terms of distance.

6. The electronic measuring instrument of claim 1 and calculator means mounted on said instrument for reading out a plurality of distance settings in terms of characteristics of an article being measured.

7. The electronic measuring instrument of claim 1 and calculator means mounted on said instrument for reading out a plurality of distance settings in terms of the weight of a jewel being measured.

8. The electronic measuring instrument of claim 1 and clamping means on said pocket for drawing the step and foot on said pocket into a secure contact with the point and step on the jaw.

9. The electronic measuring instrument of claim 8 wherein said clamping means is a thumb screw on the side of said pocket which is opposite said straight section on said one side.

10. The electronic measuring instrument of claim 8 wherein said jaw is tapered and said pocket in said adapter has a matching taper, said clamping means drawing the pocket over the jaw to wedge them into a tighter contact.

* * * * *